Figure 4:
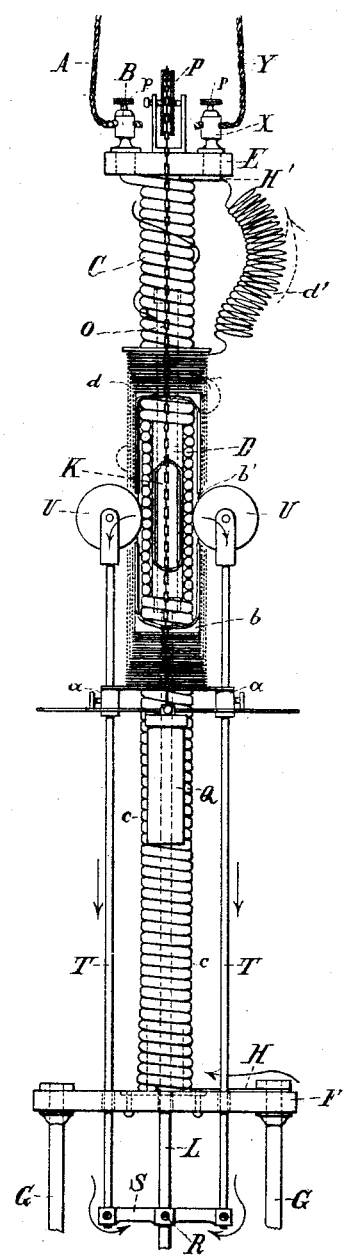

(No Model.) 5 Sheets—Sheet 1.
W. M. THOMAS.
ELECTRIC ARC LAMP.
No. 263,247. Patented Aug. 22, 1882.
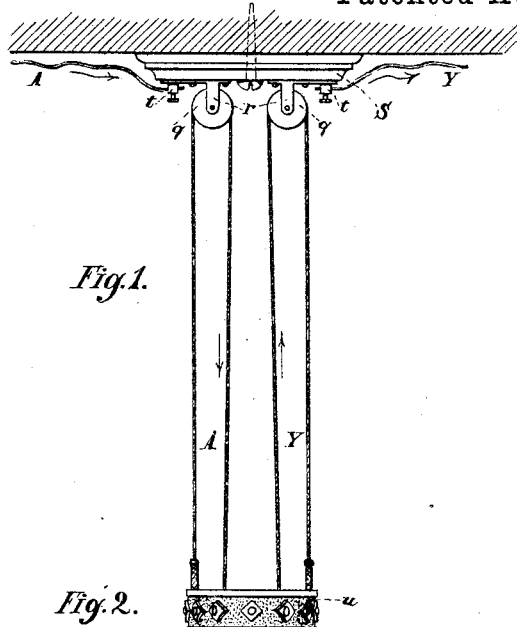
Fig. 1.
Fig. 2.
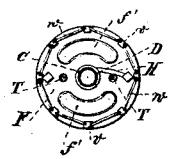
Fig. 3.
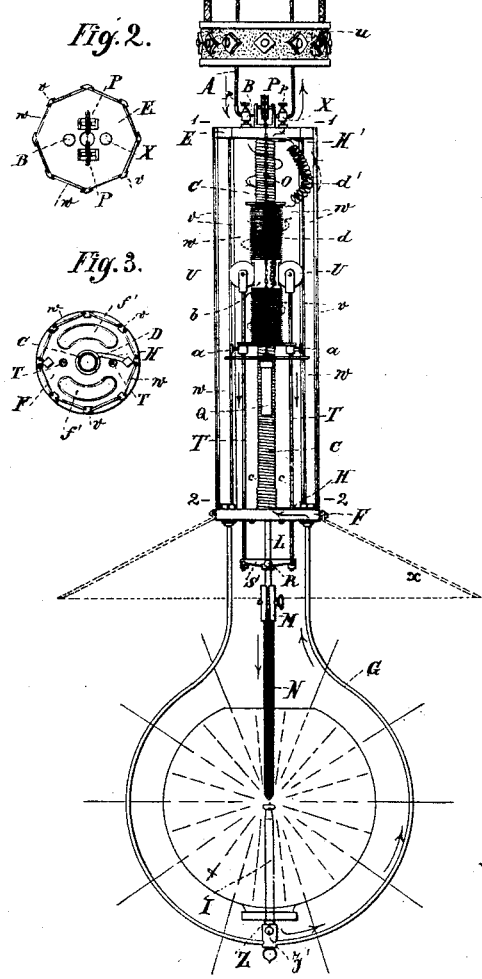
Attest:
Carl Spengel
H. C. Knight
Inventor
William M. Thomas
By Knight Bros.
Attys.

(No Model.) W. M. THOMAS. 5 Sheets—Sheet 2.
ELECTRIC ARC LAMP.

No. 263,247. Patented Aug. 22, 1882.

Attest
Carl Spengel.
H. C. Knight

Inventor
William M. Thomas
by Knight Bros.
Att'y's (No Model.)   W. M. THOMAS.   5 Sheets—Sheet 3.
ELECTRIC ARC LAMP.

No. 263,247.   Patented Aug. 22, 1882.

Attest
Carl Spengel.
H. E. Knight

Inventor
William M. Thomas
By Knight Bros.
Atty's.

(No Model.) 5 Sheets—Sheet 4.
W. M. THOMAS.
ELECTRIC ARC LAMP.
No. 263,247. Patented Aug. 22, 1882.
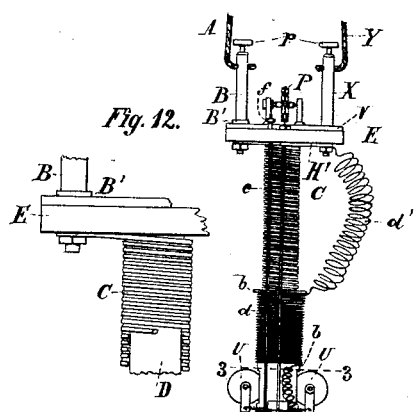
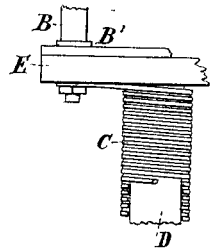
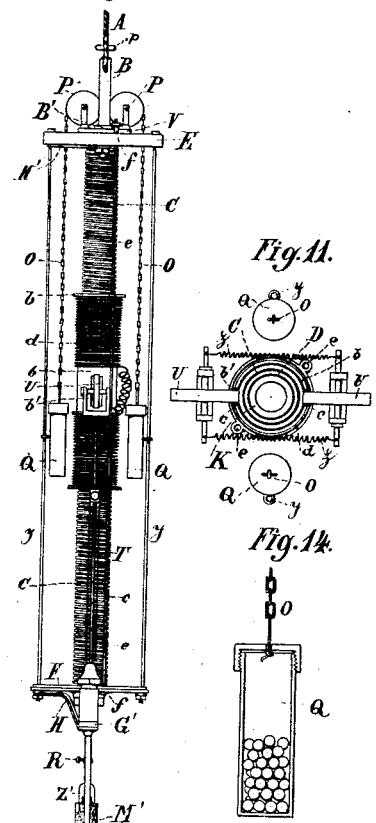
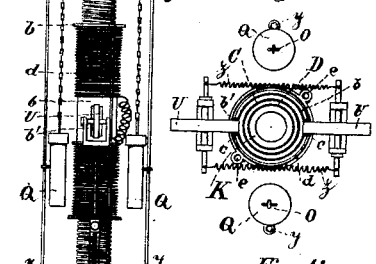
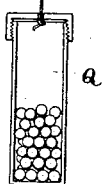
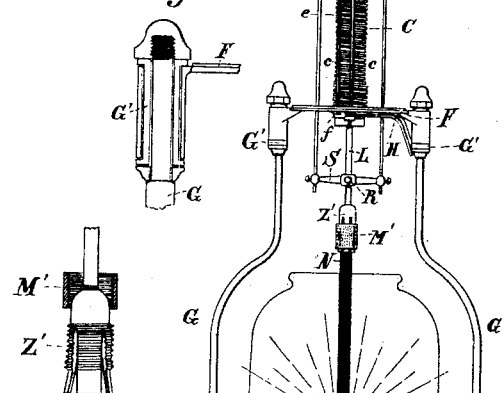
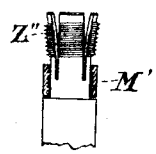
Attest
Carl Spengel
H E Knight
Inventor
William M. Thomas
by Knight Bros.
att'ys.

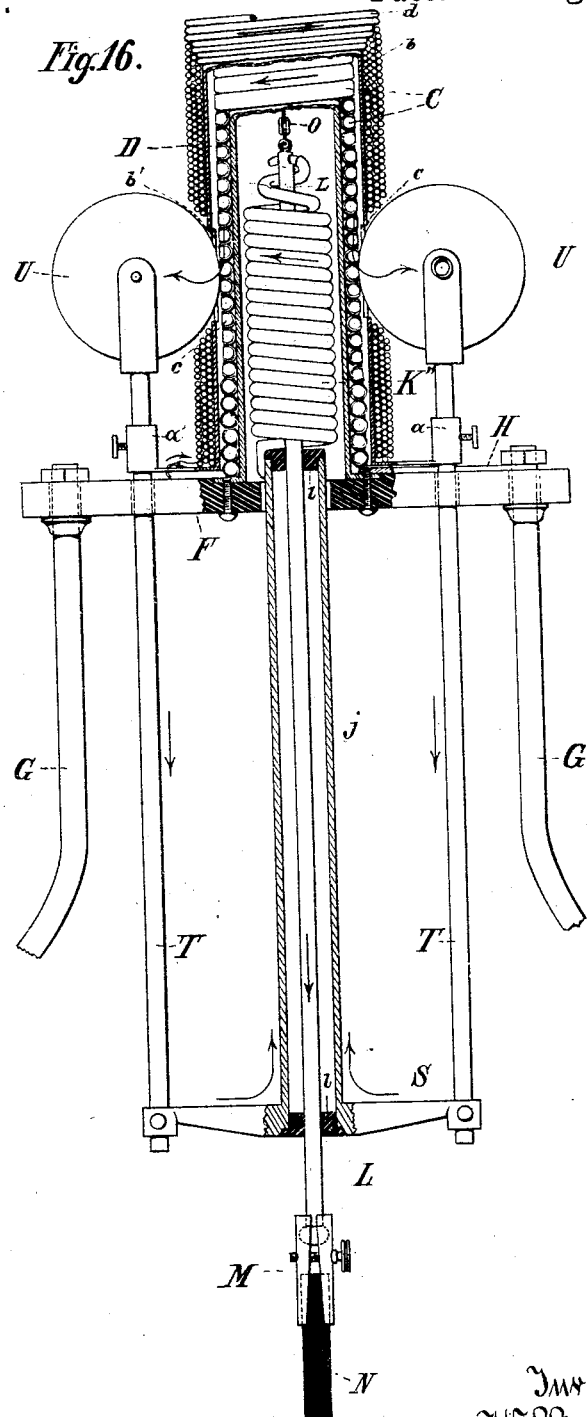

UNITED STATES PATENT OFFICE.

WILLIAM M. THOMAS, OF CINCINNATI, OHIO, ASSIGNOR OF ONE-HALF TO SAMUEL W. SKINNER, OF SAME PLACE.

ELECTRIC-ARC LAMP.

SPECIFICATION forming part of Letters Patent No. 263,247, dated August 22, 1882.

Application filed April 29, 1882. (No model.)

*To all whom it may concern:*

Be it known that I, WILLIAM M. THOMAS, of Cincinnati, Hamilton county, Ohio, have invented new and useful Improvements in Electric-Arc Lamps, of which the following is a specification.

My improvements are especially intended for arc electric lamps such as described in my Patent No. 253,322, granted 7th February, 1882, and my present invention, as to its principal feature, is designed for the equalization of such arc-lamps when used "in series."

It is well known that no two electric lamps employed in series behave precisely alike. In one lamp the magnetic lift incident to increased current flow takes place more promptly and with greater facility, with a consequently greater arc interval, than in the others. Such disproportionate increase of arc interval in one lamp necessarily weakens the current throughout the series, and thus detracts from the lifting-power of all, but most so from those of most sluggish movement. The heavier-working lamps, thus dwindling in illuminative action, cease one by one to respond to the continually-waning magnetic energy. In strong contrast with and at the expense of this enfeebled action of the weaker lamps, the arc of the most susceptible or easiest-working lamp continues to expand until it practically monopolizes the effective activity of the entire circuit. The remedy for such unequal action lies in a provision whereby all current in any lamp in excess of its proper quota is automatically diverted to the next lamp in the series, (or, if the lamp be the last in the series, to line or the generator, as the case may be,) and whereby such overflow current is at the same time utilized either to reduce or counteract to a greater or less extent the helix suction upon the core or armature of the lamp thus regulated until the arc interval is restored to its normal dimensions.

In my present invention illuminative equalization throughout a given series of arc electric lamps is secured by the mechanical force due to the current-repulsion of the carrier of the shunted current or overflow of each respective lamp. With this object in view a portion of the overflow-wire, having a resistance which renders it inert during normal action, is so wound upon a non-magnetic bobbin attached to and traveling with the positive-electrode holder as to surround, without touching, the prime helix, and, when carrying off overflow, to conduct the current in a direction reverse to that of the said helix. This overflow-current carrier (hereinafter called the "differential") has electrical connection by its lower end with the positive electrode and by its upper end with line beyond the negative electrode, so as whenever called into action to shunt or short-circuit the arc. In this arrangement of differential the polarity of the regulating core or armature is not affected; but its mechanical potency is, during abnormal activity of the lamp, counteracted to a greater or less extent, commensurate with the overflow, by the opposing downward pull of the excited differential. As above intimated, these movements operate in a twofold capacity—namely, by reducing to normal length the arc of the individual lamp and by diverting all superabundant current to the weaker lamps, resulting in uniform arc intervals and equal illuminative action throughout the series.

Figure 5:
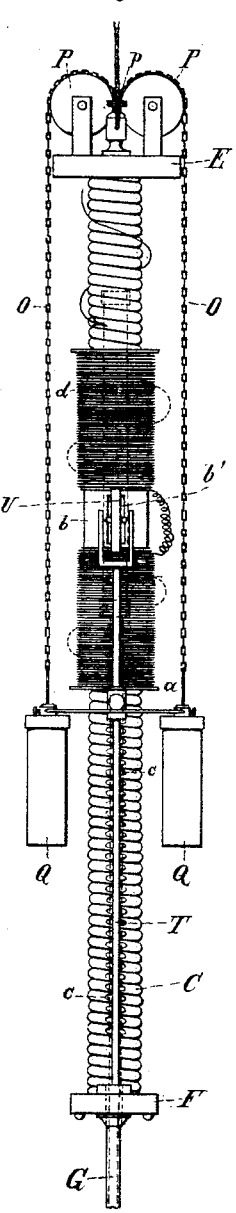
Figure 6:
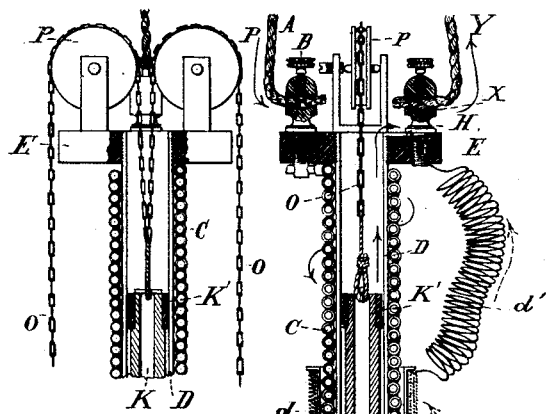
Figure 7:
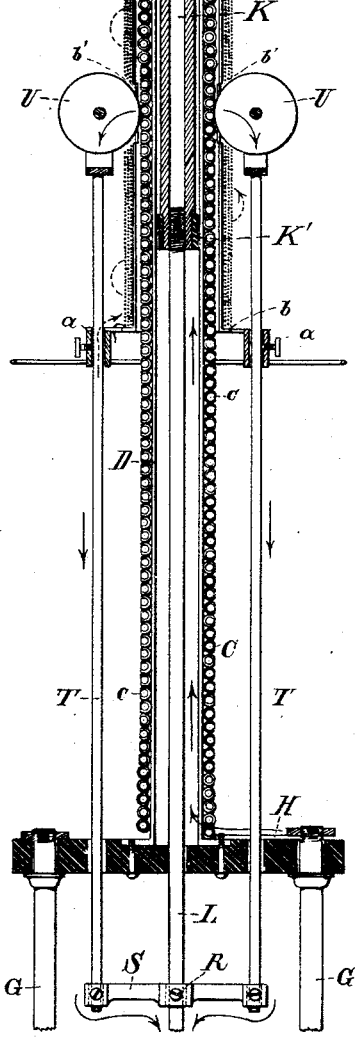
Figure 8:
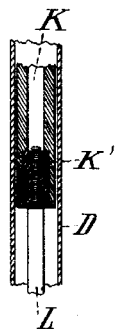

In the accompanying drawings, Figure 1 is a front elevation of an arc electric lamp provided with my equalizer. Figs. 2 and 3 are sections on lines 1 1 and 2 2, respectively. Figs. 4 and 5 are respectively a front elevation and a side elevation of the helices and their immediate adjuncts, portions of the main and differential helices being broken away to expose the sliding contact. Fig. 6 is a section in the plane of the geometrical axis common to the helices and armature. Fig. 7 is an axial section at right angles to Fig. 6, showing the mode of counterbalancing the armature. Fig. 8 shows another mode of connecting the armature with its stem. Fig. 9 is a front and Fig. 10 is a side elevation of a form of my lamp adapted for use with two carbons. Fig. 11 is a section on the line 3 3, Fig. 9. Fig. 12 represents to a larger scale the upper part of my prime helix and its connection with the positive binding-post. Fig. 13 is an enlarged section of one of the two insulating-joints by which the pendant is attached to the lower collar. Fig. 14 is an enlarged section of one of the counterpoises. Fig. 15 represents my carbon-holders to a larger scale. Fig. 16 shows by axial section a modification of my equalizer in which a simple solenoid takes the place of the soft-iron core or armature.

The lamp proper, irrespective of the equalizing attachment, may be substantially as described in my patent aforesaid, in which the positive wire or rheophore A from the generator (or from line or a preceding lamp, as the case may be) connects by binding-post B upon non-conducting collar E with a stationary coil or helix, C, of insulated wire, which is wound around a non-magnetic metal bobbin, D, whose ends are secured in the non-conducting collars E F.

A metallic pendant, G, attached to lower collar, F, supports and has electrical connection with the lower or negative electrode, which may be either of refractory metal, as at I, Fig. 1, or of carbon, as at J, Figs. 9 and 10.

A metallic stem, L, is surmounted by a soft-iron core or armature, K, that has capacity for longitudinal vibration coincident with the axis of the stationary helix C, and that terminates below in a clamp, M, for a rod of carbon, N, that constitutes the positive electrode.

One or more chains, O, attached to top of core K, pass over as many sheaves P to counterpoises Q, whose aggregate weight is such as to nearly balance that of the core and its attachments, the weight of the chains itself being such as to compensate for the diminishing weight of the gradually-consuming carbon by the transfer of successive portions of the chains from the outside to the inside of the helix.

Fastened by set-screw R to stem L is a metallic cross-bar, S, from whose extremities arise two slender rods, T, of spring-brass, in whose upper ends are journaled brass wheels U, whose peripheries by virtue of the elasticity of the rods T press moderately against the periphery of the stationary helix C on diametrically remote sides thereof. Along the narrow paths or lines of contact traversed by the wheels U the insulating envelope of the helix-wire is removed, so as to expose naked tracks $c$, which bring the wheels into direct electrical communication with the wire at the (for the time being) points of contact.

One side of pendant G has electrical communication by strip H with bobbin D, which, by another strip, H', communicates with the negative binding-post X on the upper collar, E, whence the current escapes by wire Y to the next lamp in the series, or to line or the generator, as the case may be. Where the bobbin D is thus made to do duty as a portion of the channel of the escaping current, collars K' upon the armature K serve to insulate armature from bobbin.

The rheophore-wires may, as shown in Figs. 1, 4, 5, 9, and 10, consist for a part of their length in copper cables whose lower ends are secured in their respective binding-posts by means of screws $p$. These cables may pass over sheaves $q$, journaled in hangers $r$, attached to a non-conducting slab, $s$, which may be secured to ceiling or other fixture. Binding-posts $t$ on said hangers enable the attachment of the line-wires or rheophores proper. To the other extremities of said cables may be suspended a counterpoise, U.

Posts $v$ connecting the upper and lower collars, E F, may receive glass panes $w$, and glazed openings $f'$ in collar F may admit light to, while excluding dust and moisture from, the parts above said collar.

A reflector (see dotted lines $x$) may be attached to the lower collar, F.

The carbons may be grasped by split tubes or holders Z' Z'', tightened upon them by sliding or screwing sleeves M'.

The socket Z may be pierced to permit insertion and adjustment of the negative-carbon holder, which may be secured by a set-screw, $z'$.

The positive and negative binding-posts B and X may be attached to a single metallic base, V, which is itself attached to a wooden or other non-conducting collar, E, the positive binding-post B being in that case insulated by a vulcanite washer, B'.

The collar F may be metallic, and insulation of the pendant be secured by means of vulcanite bushings G'.

Carbon may be employed for both electrodes, as shown in Figs. 9 and 10, the pendant (and the globe where one is used) being made long enough to accommodate the travel of the point of light incident to the consumption of the negative electrode.

The counterpoises may be guided to a vertical path by rods $y$, which extend from collar to collar, and one of these rods may be made available as a portion of the channel of the escaping current, being for this purpose connected by strips H H' with the lower and upper negative binding-posts, respectively.

The pressure of wheels U upon their tracks may be enhanced by means of springs $z$.

The wire of the prime or stationary helix is preferably flat in transverse section, with its greatest thickness in direction radial to the helix, as shown in Fig. 12, and without fibrous covering, its preferred application being made as follows: The bobbin D is wrapped with paper, and the wire being wound edgewise upon it in slightly-separated convolutions, the interstices are filled with plaster-of-paris or other non-conducting refractory cement, thus saving the expense of fibrous wrappings, and employing at little cost a very close system of winding, with a greater number of convolutions to the inch, a larger mass of metal in proximity to the armature, and greater sensitiveness of the shifting conductor action than by any other known means. It being intended to incorporate this feature in a separate application for patent, a more specific description is deemed unnecessary here.

My lamp is adapted for use in series by means as follows:

Attached at any desired height to the positive-electrode holder by screw-clamps $a$ is a light non-magnetic tube or bobbin, $b$, preferably of brass. A very fine insulated wire, $d$, (called in this specification the "differential,") whose lower extremity has electrical connection with the positive electrode through its holder, and whose upper extremity is connected to circuit beyond the electrodes, is of such resistance as to be inert during normal action, but such as to give way before a superabundant current, and thus enable the surplus to overflow to the next lamp in the series, or to line or the generator, as the case may be. Said wire d is so wound upon the bobbin b as that whenever active its current shall flow in reverse direction to the neighboring current of the prime helix, so as to subject said differential helix to a downward current-repulsion proportionate to the activity of the overflow. A consequence of this mutual repulsion is that the differential, whenever energized by an overflow, tends to move in the opposite direction to the armature suction, and both differential and armature being rigidly attached to the positive-electrode holder, it follows that, without sensibly diminishing the armature magnetism, said differential exerts a mechanical pull which, to the extent of its force for the time being, neutralizes to a greater or less degree the "lift" of the armature.

Negative connection of the differential without sensibly impeding its vertical movement is secured in any desired way—such, for example, as in the convoluted form shown at d'.

It will be seen that the differential preserves throughout its movements up and down a constant relative position to the other appendages of the positive electrode, and the points of contact of the wheels U being preferably about mid-height of the differential, the bobbin b is at its mid-length left bare of wire, except a single filament to connect its upper and lower bundles, and has slots b' on its diametrically-remote sides to permit said wheels' contact with the bared tracks c.

The differential may, as in Figs. 9 and 10, be restricted to its proper vertical movement by rods e, which, extending from collar E to collar F through orifices in the flange of the bobbin b, are held taut by means of nuts f, and, inasmuch as the differential bobbin is rigidly secured to the rods T at a, the wheels U are thus retained to their proper vertical path upon the tracks c.

At Fig. 16 is shown a modification of my invention in which I use, instead of a soft-iron armature, a solenoid that consists of a helix, K″, of insulated wire similar to that of the prime helix, and so coiled as for its current to flow in the same direction as the neighboring current of the prime helix. Said helix K″ is connected below with bar S by means of a brass tube, j, and is connected above with a brass rod, L, which, extending axially downward through the helix K″ and tube j, from which it is insulated by collars l, is at its lower extremity provided with the proper clamp or holder, M, for the positive electrode or carbon.

In practice both solenoid and differential extend equally above and below the wheels U, and are of greater relative length than shown in Fig. 16. It will be seen that in this form of my invention both the normal and the differential regulations are secured by the attractive and repellent energies of simple helices or current-carriers without the use of any ferromagnetic element or magnetized mass.

The form of my invention just described with reference to Fig. 16 of the drawings, although herein fully explained, is not claimed by me in this application, being reserved for claim in a subsequent application.

Having thus described my invention, the following is what I claim as new therein and desire to secure by Letters Patent:

1. In an arc electric lamp in series having a fixed helix in a main circuit that includes the electrodes, a helix of high resistance surrounding said fixed helix in a circuit derived from said main circuit and attached to the positive electrode, and a simultaneously movable core common to both helices, whereby the feed and position of the electrode are controlled and equal action maintained throughout the series by the joint action of two opposing electric forces, substantially as and for the purposes set forth.

2. In an arc electric lamp in series, a stationary helix in the circuit which includes the electrodes, in combination with a surrounding movable helix in a circuit derived from said main circuit, and a simultaneously movable core common to both of said helices, and adapted and arranged to be lifted by electric influence from the stationary helix, and to be subject to depression by repulsion upon the attached differential helix which surrounds said main helix, so as to maintain uniform arc-lengths throughout the series, in the manner set forth.

3. In an arc electric lamp in series, the combination of a stationary helix in communication with the positive rheophore, and the following members attached to and moving with the positive electrode, to wit: a sliding conductor upon a bared track on said helix's periphery, an interior suction-core, and an exterior concentric differential shunt, substantially as and for the purposes set forth.

4. In an arc electric lamp in series, a stationary helix in a circuit which includes the arc, in combination with a shifting positive electrode, to which are attached a suction-core which occupies an axial position within said helix, and is attracted upward thereby, and an overflow-helix of high resistance that encircles said stationary helix and is in a circuit derived therefrom, and when energized acts in mechanical opposition thereto in proportion to the overflow, substantially as and for the purposes set forth.

5. In an arc electric lamp in series, a shifting conductor which is rigidly attached to and which travels with the consuming electrode upon a longitudinal bared track on the exterior periphery of a stationary helix, said conductor, together with the portions of said helix thus brought into circuit, constituting the electrical communication from the generator to said electrode, so as to shift the said helix's magnetic field and to maintain a practically-constant magnetic equipoise to the said electrode, there being also attached to said shunt a counterpoise and a suction-core and differential overflow-coil which are concentric with and respectively interior and exterior to said helix, substantially as and for the purposes set forth.

6. In an arc electric lamp in series, a shifting conductor which is rigidly attached to and travels with the consuming electrode upon a longitudinal bared track on the periphery of the prime helix, and which constitutes the electrical communication from the generator to the said electrode, so as to shift the helix's magnetic field and to maintain a practically-constant magnetic equipoise to the said electrode, in combination with a similarly-attached and traveling suction-core and a differential coil that surrounds said helix, and is so wound with a wire of higher resistance than the normal arc and so connected with line beyond it as to divert the overflow and to counteract the core-suction in proportion to such overflow, substantially as and for the purposes set forth.

7. In an arc electric lamp in series, the combination, with a stationary helix, C, conveying current through bared track $c$ on said helix's exterior periphery, and thence through a shifting conductor, U T S, to the electrodes, of the following members attached to said conductor, to wit: a central armature or suction core, the positive electrode N, and a coil, $d$, of higher resistance than that of the normal arc, concentric with and exterior to the stationary helix and electrically connecting said conductor with line beyond the arc, so as to divert the overflow, and so wound as to be repelled by said stationary helix in proportion to the overflow energy, as and for the purposes set forth.

8. In the described combination with stationary helix C, having electrical connection above with the positive rheophore, and below through bared track $c$ on its exterior periphery and shifting conductor U T S with the positive electrode, the following members attached to and traveling with said electrode, to wit: a suction-core interior to and attracted by said helix and a longitudinally-guided differential coil, $d$, that surrounds said helix, and has at or near its mid-length slots $b'$, which receive the wheels U of said conductor, substantially as and for the purposes set forth.

In testimony of which invention I hereunto set my hand.

WILLIAM M. THOMAS.

Attest:
GEORGE H. KNIGHT,
SAML. S. CARPENTER.